(12) United States Patent
Legg

(10) Patent No.: US 12,449,169 B2
(45) Date of Patent: Oct. 21, 2025

(54) VALVE

(71) Applicant: Dyson Technology Limited, Wiltshire (GB)

(72) Inventor: Matthew Graham Legg, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 246 days.

(21) Appl. No.: 18/038,419

(22) PCT Filed: Nov. 24, 2021

(86) PCT No.: PCT/GB2021/053052
§ 371 (c)(1),
(2) Date: May 23, 2023

(87) PCT Pub. No.: WO2022/123209
PCT Pub. Date: Jun. 16, 2022

(65) Prior Publication Data
US 2024/0093923 A1    Mar. 21, 2024

(30) Foreign Application Priority Data
Dec. 8, 2020 (GB) .................................. 2019284

(51) Int. Cl.
F25B 41/26 (2021.01)
(52) U.S. Cl.
CPC ...... *F25B 41/26* (2021.01); *F25B 2313/0276* (2013.01)
(58) Field of Classification Search
CPC .... F16K 11/0873; F16K 5/0605; F25B 13/00; F25B 2313/0276; F25B 2400/0411; F25B 41/26
See application file for complete search history.

(56) References Cited

U.S. PATENT DOCUMENTS

| 4,311,020 A | 1/1982 | Tobin et al. |
| 4,381,798 A | 5/1983 | Tobin et al. |
| (Continued) | | |

FOREIGN PATENT DOCUMENTS

| JP | 2011-202738 | * 10/2011 |
| JP | 2011-202738 A | 10/2011 |

OTHER PUBLICATIONS

International Search Report and Written Opinion received for PCT Patent Application No. PCT/GB2021/053052, mailed on Feb. 18, 2022, 8 pages.

(Continued)

*Primary Examiner* — Henry T Crenshaw
(74) *Attorney, Agent, or Firm* — Tucker Ellis LLP; Michael G. Craig

(57) ABSTRACT

There is provided a valve for a reversible heat pump system, including six ports and three flow paths for a refrigerant, the three flow paths being selectable between different pairs of the six ports, wherein: two of the three flow paths are non-restrictive flow paths; and one of the three flow paths is a restrictive flow path. There is also provided a reversible heat pump system, including: the valve; a compressor; a process heat exchanger having input and output sides through which refrigerant is supplied and discharged respectively; and a rejection heat exchanger having input and output sides through which the refrigerant is supplied and discharged respectively, wherein the valve interconnects the compressor, the process heat exchanger and the rejection heat exchanger such that a refrigeration cycle can be established.

20 Claims, 4 Drawing Sheets

(56) References Cited

U.S. PATENT DOCUMENTS

2014/0353536 A1\* 12/2014 Le Pellec .............. F16K 5/0642
                                                                          251/315.13
2020/0318877 A1\* 10/2020 Nakajima ................. F25B 5/02

OTHER PUBLICATIONS

Search Report received for GB Application No. 2019284.5, mailed on May 27, 2021, 1 page.

\* cited by examiner

VALVE

CROSS-REFERENCE TO PRIOR APPLICATION

This application is a § 371 National Stage Application of PCT International Application No. PCT/GB2021/053052 filed Nov. 24, 2021, which claims the priority of United Kingdom Application No. 2019284.5, filed Dec. 8, 2020, each of which are herein incorporated by reference in their entirety.

TECHNICAL FIELD

The present disclosure relates to a valve suitable for a reversible heat pump system. The present disclosure also relates to a reversible heat pump system.

BACKGROUND

Reversible heat pump systems require some means of reversing the direction of refrigerant flow through the system, in order to enable a transition from a cooling mode to a heating mode. This is usually achieved using a four-way valve in combination with multiple expansion and check valves, to ensure the correct direction of flow of refrigerant through the system in addition to controlling the refrigerant flowrate, pressure and temperature. However, the inclusion of multiple different valve components adds significant complexity to the system. This results in increased cost and a greater number of potential failure modes of the system. In addition, a relatively large amount of refrigerant pipework is required to interconnect all of the components, which results in the system requiring a relatively large mass of refrigerant.

It is an object of the present disclosure to provide an improved valve for a reversible heat pump system. It is a further object of the present disclosure to provide a reversible heat pump system with a reduced number of refrigerant circuit components.

SUMMARY

According to a first aspect of the present disclosure, there is provided a valve for a reversible heat pump system, the valve comprising: six ports and three flow paths for a refrigerant, the three flow paths being selectable between different pairs of the six ports, wherein: two of the three flow paths are non-restrictive flow paths; and one of the three flow paths is a restrictive flow path.

In embodiments, the restrictive flow path is arranged to cause expansion of the refrigerant. In this manner, certain components of a traditional heat pump system, such as the separate expansion and check valves, can be consolidated into a single valve device, which can be actuated to select between heating and cooling modes of a heat pump system. Therefore, it is not required to employ separate expansion valves, since the restrictive flow path itself causes refrigerant expansion by causing a pressure drop in the refrigerant flow through the restrictive flow path.

In embodiments, the amount of expansion of the refrigerant caused by the restrictive flow path is variable as a function of the valve position. In this manner, the valve enables precise control of the heat pump system performance (i.e. the degree of heating and cooling).

In embodiments, the restrictive flow path comprises a tapering slot.

In embodiments, the restrictive flow path is arranged to cause a linear change in the expansion of the refrigerant as a function of the valve position.

In embodiments, the non-restrictive flow paths are arranged to cause substantially no expansion of the refrigerant.

In embodiments, the thermal conductivity of the valve between the non-restrictive flow paths is greater than the thermal conductivity of the valve between each of the non-restrictive flow paths and the restrictive flow path. In this manner, the efficiency of the refrigeration cycle can be enhanced, because the valve body itself can aid in either pre-heating or pre-cooling the refrigerant prior to or after undergoing compression. This helps to improve the coefficient of performance of a heat pump system in which the valve is used.

In embodiments, the valve further comprises a thermally insulating barrier between each of the non-restrictive flow paths and the restrictive flow path. This helps to improve the coefficient of performance of a heat pump system in which the valve is used.

In embodiments, the valve further comprises a thermally conductive material between the non-restrictive flow paths. This helps to improve the coefficient of performance of a heat pump system in which the valve is used.

In embodiments, the valve further comprises a motor which is operable to reselect the flow paths between the six ports.

In embodiments, the valve comprises a ball valve. A ball valve is a convenient platform in which to implement the valve of the first aspect, since ball valves typically provide a good seal. However, alternative layouts, such as a slide-type valve, may instead be used.

According to a second aspect of the present disclosure, there is provided a reversible heat pump system, comprising: the valve according to the first aspect; a compressor; a process heat exchanger having input and output sides through which refrigerant is supplied and discharged respectively; and a rejection heat exchanger having input and output sides through which the refrigerant is supplied and discharged respectively, wherein the valve interconnects the compressor, the process heat exchanger and the rejection heat exchanger such that a refrigeration cycle can be established.

By employing the valve according to the first aspect, the reversible heat pump system of the second aspect can function with fewer components and refrigerant interconnects than conventional reversible heat pump systems. In addition, the system can function with a smaller total volume of refrigerant. This results in decreased complexity, cost, and maintenance.

In embodiments, in a first valve position, the process heat exchanger is arranged to provide cooling.

In embodiments, in a second valve position, the process heat exchanger is arranged to provide heating.

In embodiments, the direction of flow of the refrigerant through each of the process heat exchanger, the rejection heat exchanger and the compressor is the same in both the first and second valve positions. Therefore, unlike the conventional system, the direction of flow of refrigerant is the same in both the heating and cooling modes. It is desirable not to change the direction of refrigerant flow, since this can result in some instability which is avoided in the heat pump system of embodiments.

In embodiments, in the first valve position, the restrictive flow path is coupled to the output side of the rejection heat exchanger and the input side of the process heat exchanger.

In embodiments, in the second valve position, the restrictive flow path is coupled to the output side of the process heat exchanger and the input side of the rejection heat exchanger.

In embodiments, in the first valve position a first one of the non-restrictive flow paths is coupled to the output side of the process heat exchanger and the compressor input; and a second one of the non-restrictive flow paths is coupled to the compressor output and the input side of the rejection heat exchanger.

In embodiments, in the second valve position: the first non-restrictive flow path is coupled to the compressor output and the input side of the process heat exchanger; and the second non-restrictive flow path is coupled to the output side of the rejection heat exchanger and the compressor input.

In embodiments, the heat pump system further comprises a controller configured to control the valve between the first and second valve positions.

In embodiments, the controller is further configured to: receive a user input temperature and/or a measured temperature corresponding to a room comprising the process heat exchanger; and control the valve between the first and second valve positions and/or the amount of expansion of the refrigerant caused by the restrictive flow path in dependence on the user input temperature and/or the measured temperature.

It should be appreciated that features described in relation to one aspect of the present disclosure may be incorporated into other aspects of the present disclosure.

DESCRIPTION OF THE DRAWINGS

Embodiments of the present disclosure will now be described by way of example only with reference to the accompanying schematic drawings of which.

DETAILED DESCRIPTION

Figure 1A:
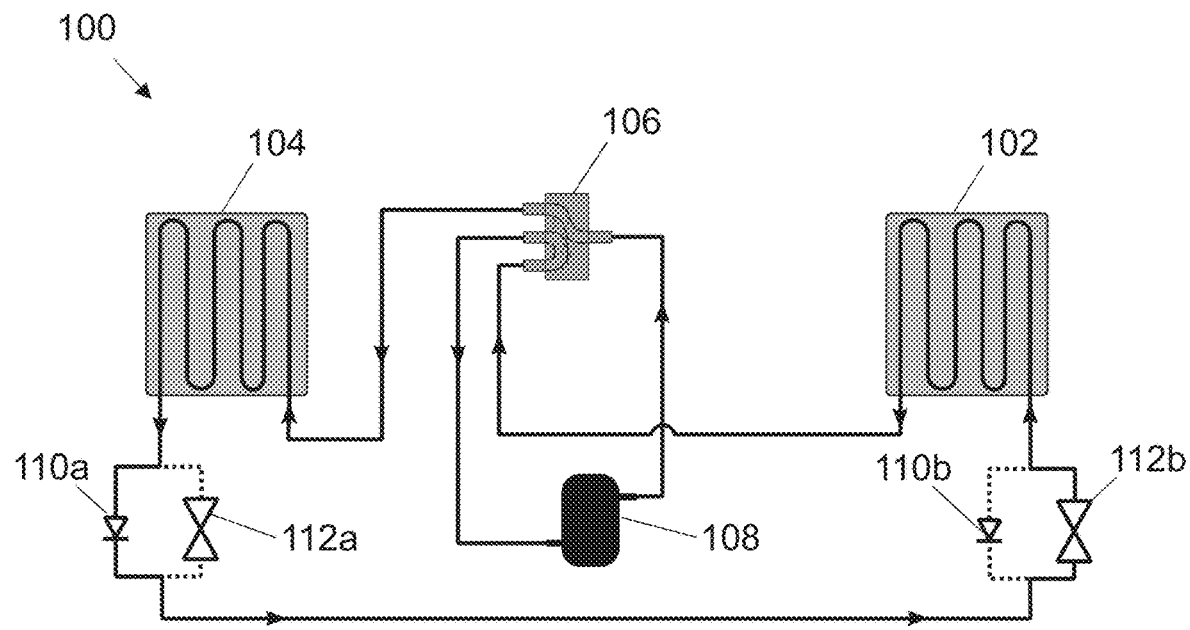
FIGS. 1a and 1b illustrate a prior art reversible heat pump system.
Figure 1B:
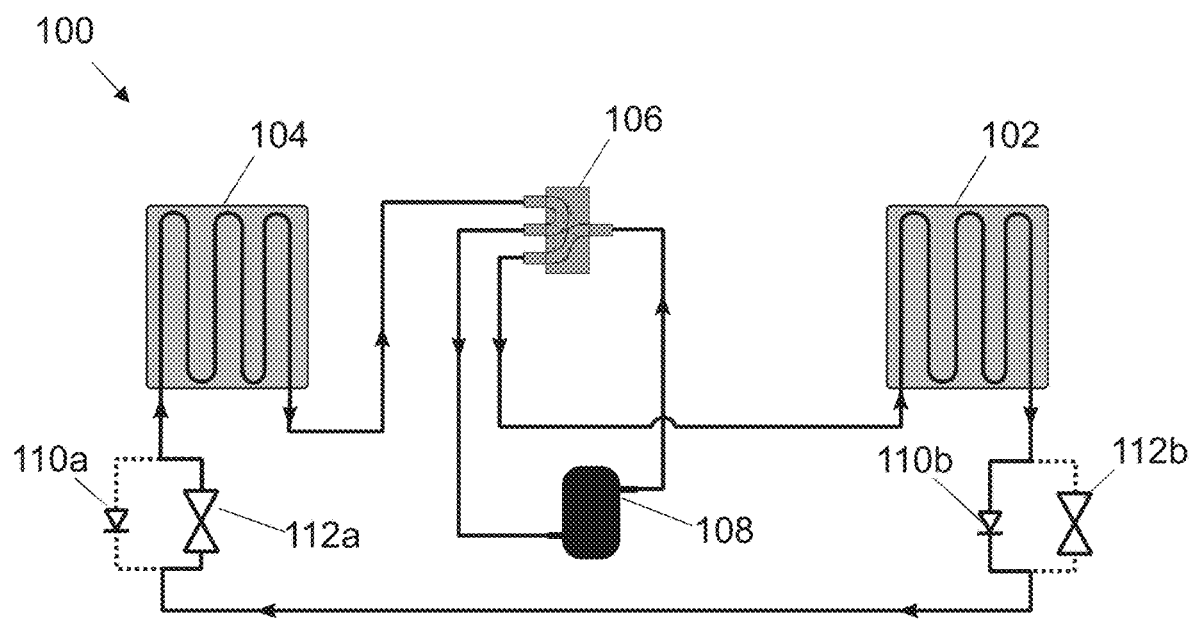

FIGS. 1a and 1b illustrate a prior art reversible heat pump system 100. In FIG. 1a the system is providing cooling, whereas in FIG. 1b the system is providing heating. A process heat exchanger 102 provides heating or cooling to a chosen environment, such as a room, for example. A separate rejection heat exchanger 104 disposes of unwanted heat energy, or recovers heat energy, to or from some other environment. A four-way valve 106, typically in the form of a shuttle valve, is used to reconfigure the system 100 between the heating and cooling modes. A compressor 108 compresses the refrigerant. In order to achieve reversible operation, additional flow control components are required in addition to the four-way valve 106. These additional components consist of a pair of expansion valves 112a, 112b and a pair of check valves 110a, 110b, which are selectively operated depending on whether the system 100 is operating in the heating or cooling mode. It should be noted that the direction of refrigerant flow, indicated by the arrows in FIGS. 1a and 1b, changes depending on whether the system 100 is operating in the heating or cooling mode.

Figure 2:
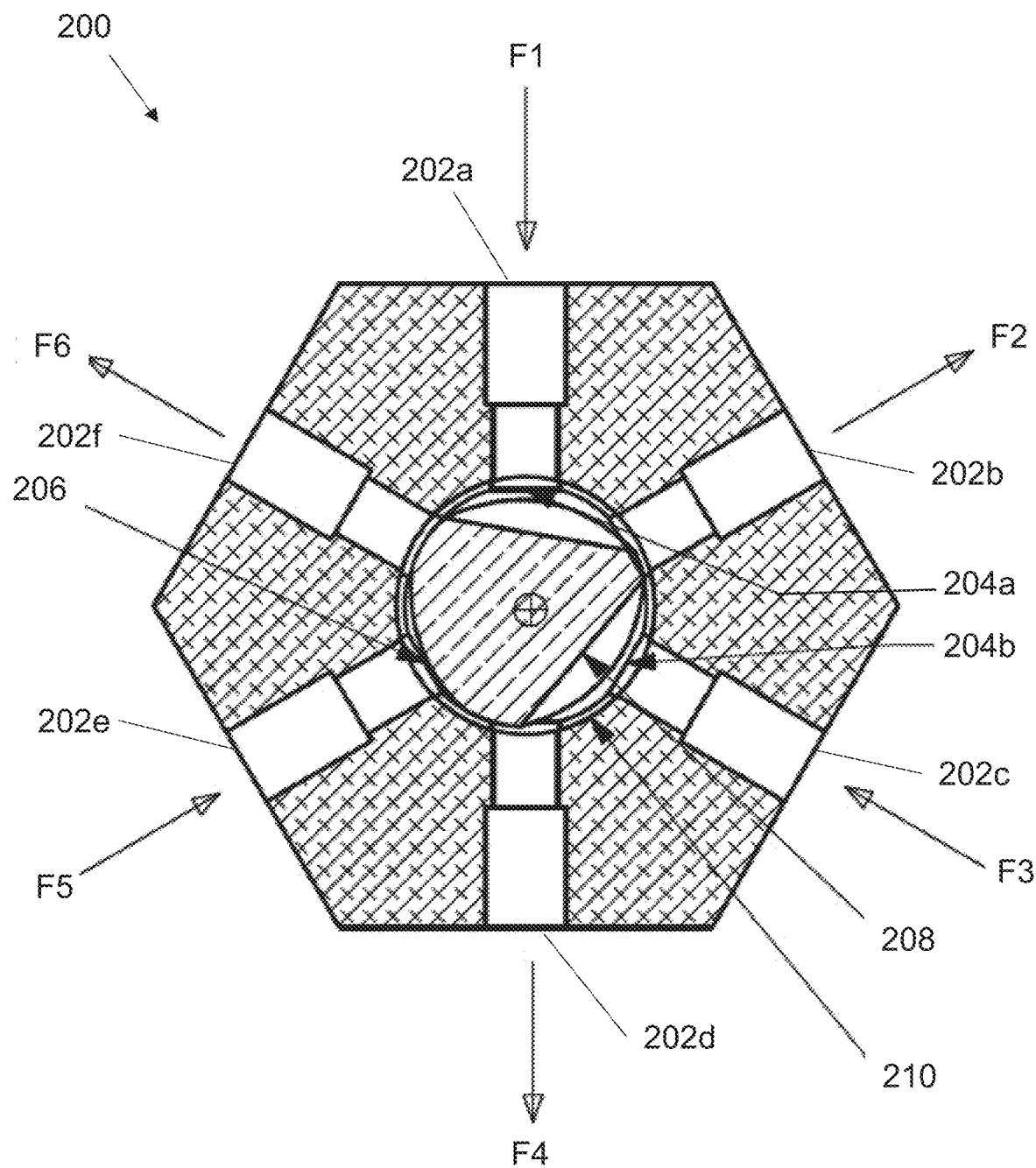
FIG. 2 illustrates a valve according to embodiments of the present disclosure.

FIG. 2 illustrates in cross section a valve 200 for a reversible heat pump system according to embodiments of the present disclosure. In this regard, the valve 200 is a reversing valve. As will become apparent, the valve 200 has utility in reversible heat pump systems, whereby additional separate components such as check valves 110a, 110b and expansion valves 112a, 112b are not required in order to achieve controlled, reversible heat pump operation. The valve 200 has six ports 202a-202f allowing for respective flows F1-F6 of a fluid, such as a refrigerant, into and out of the valve 200. By way of example, when used in a reversible heat pump system operating in a cooling mode, flow F1 may be from a compressor, flow F2 may be to a rejection heat exchanger, flow F3 may be from a process heat exchanger, flow F4 may be to the compressor, flow F5 may be from the rejection heat exchanger and flow F6 may be to the process heat exchanger.

Internally, the valve 200 has three flow paths 204a, 204b, 206 which are selectable between different pairs of the six ports 202a-202f. Two of the three flow paths 204a, 204b are non-restrictive flow paths. The remaining one of the three flow paths 206 is a restrictive flow path. The restrictive flow path 206 is arranged to cause pressure drop and so-called expansion of a refrigerant, whereas the non-restrictive flow paths 204a, 204b are arranged to cause substantially no expansion of the refrigerant and pressure drop, i.e. the non-restrictive flow paths 204a, 204b leave the thermodynamic properties of the refrigerant substantially unchanged and only re-route the refrigerant flow between the corresponding pair of ports. The restrictive flow path 206 is arranged to reduce the pressure of the refrigerant. In other words, the restrictive flow path 206 causes a pressure drop of a refrigerant, in a manner similar to the operation of an expansion valve, for example.

In embodiments, the amount of expansion of the refrigerant caused by the restrictive flow path 206 is variable as a function of the valve position. For example, the restrictive flow path 206 may be formed of a tapering slot which may cause a linear change in the expansion of the refrigerant as a function of the valve position. In this manner, the valve 200 enables control of the amount of expansion of a refrigerant and therefore enables control of the amount of heating and cooling of a heat pump system in which the valve 200 is used.

In embodiments, the thermal conductivity of the valve 200 between the non-restrictive flow paths 204a, 204b is greater than the thermal conductivity of the valve between each of the non-restrictive flow paths 204a, 204b and the restrictive flow path 206. In this manner, the efficiency of the refrigeration cycle can be enhanced, because the valve body itself can aid in either pre-heating or pre-cooling the refrigerant prior to undergoing compression. A thermally insulating barrier may additionally be provided between each of the non-restrictive flow paths 204a, 204b and the restrictive flow path 206 to further enhance the coefficient of performance of a heat pump system in which the valve 200 is employed.

The valve 200 according to the embodiments of FIG. 2 is in the form of a ball valve, which has a valve ball 208 and a valve seat 210. It should be appreciated that other types of valve could be used and still benefit from the functions set forth in the present disclosure. For example, the valve could be in the form of a six-port shuttle valve. A motor (not illustrated) may be provided which is operable to reselect the flow paths between the six ports 202a-202f by turning the valve ball 208 within the valve seat 210. The same motor can also be configured to precisely control the amount of expansion caused by the restrictive flow path 206 by making fine adjustments to the valve ball 208 position about a mid-point. In embodiments, the motor is controlled by a controller.

Figure 3A:
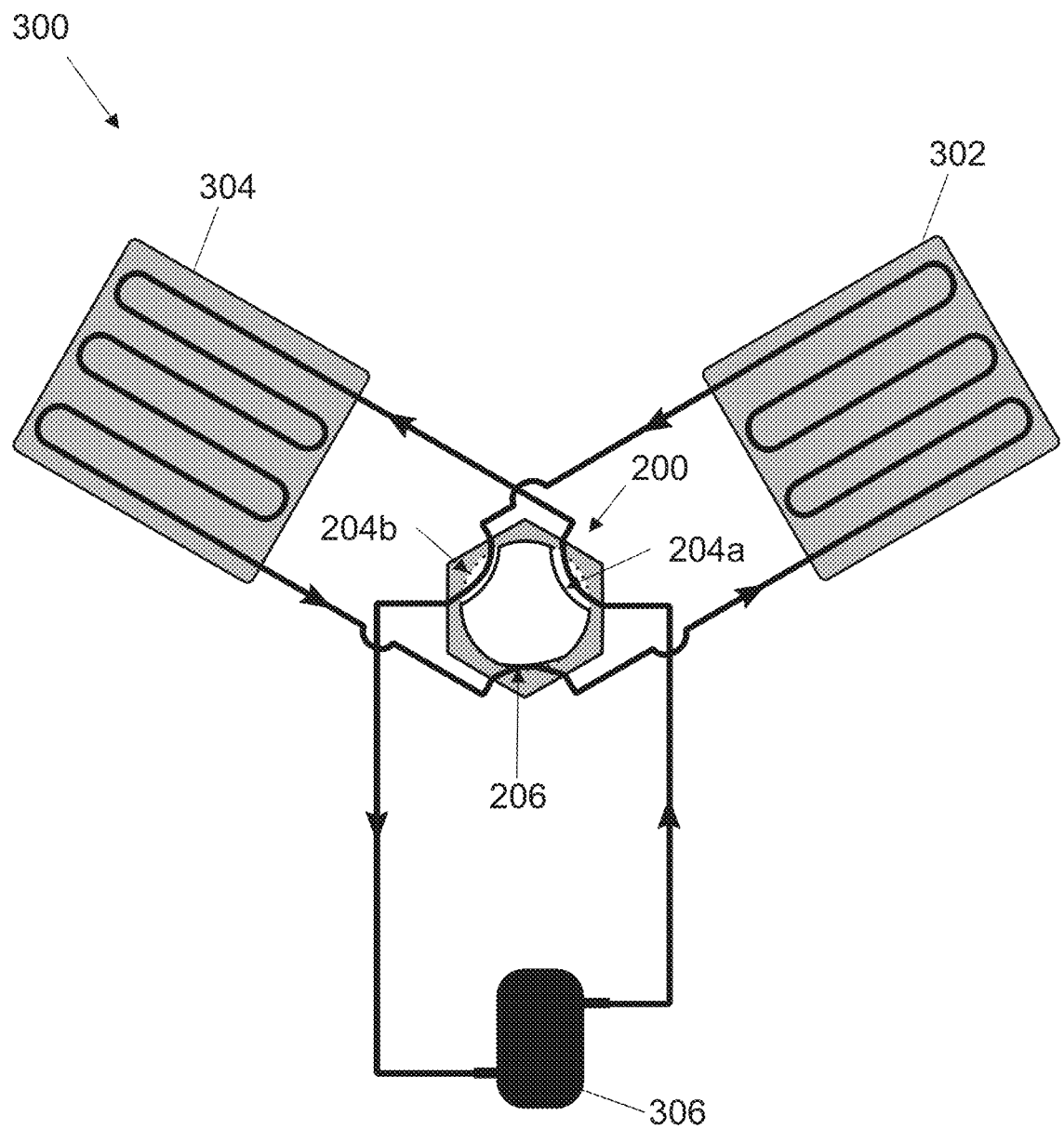
FIGS. 3a and 3b illustrate a reversible heat pump system according to embodiments of the present disclosure.
Figure 3B:
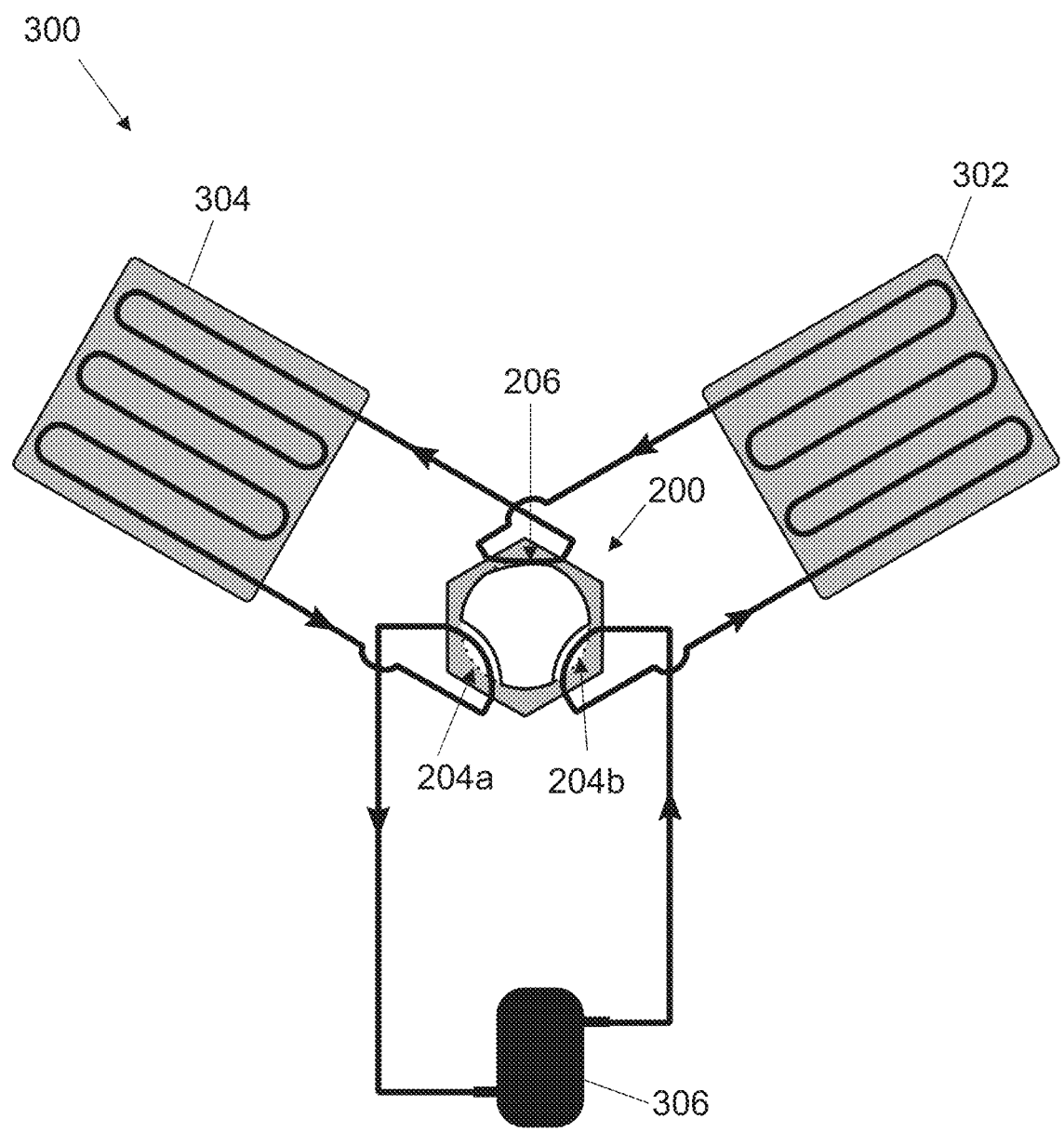

FIGS. 3a and 3b illustrate a reversible heat pump system 300 according to embodiments of the present disclosure. In FIG. 3a the system 300 is providing cooling, whereas in FIG. 3b the system 300 is providing heating. The system 300 uses a valve 200 according to the embodiments described above with reference to FIG. 2. The valve 200 interconnects a process heat exchanger 302 (which provides heating or cooling to a chosen environment, such as a room, for example), a rejection heat exchanger 304 (which disposes of unwanted heat energy, or recovers heat energy, to or from some other environment) and a compressor 306. A refrigeration cycle is thereby established. However, in contrast to the system 100 illustrated in FIGS. 1a and 1b, it should be noted that no additional components, such as check valves 110a, 110b and/or separate expansion valves 112a, 112b are required.

The fluid flows F1-F6 described above with reference to FIG. 2 apply to the system 300 of FIGS. 3a and 3b. In FIG. 3a, the valve 200 is in a first valve position such that the process heat exchanger 302 is arranged to provide cooling. Superheated refrigerant is received from the process heat exchanger 302 and routed to the compressor 306 via one of the non-restrictive flow paths 204a, 204b. The compressor compresses the refrigerant and increases the pressure and temperature of the refrigerant and the resultant superheated high pressure refrigerant is routed to the rejection heat exchanger via the other one of the non-restrictive flow paths 204a, 204b. The rejection heat exchanger 304 disposes of heat energy, cooling the refrigerant, which then exits the rejection heat exchanger 304 as a subcooled liquid and passes through the restrictive flow path 206. The restrictive flow path 206 causes substantial pressure drop and expansion of the refrigerant, lowering its temperature and pressure. The flow then continues to the input of the process heat exchanger and the cycle repeats.

In FIG. 3b, the valve 200 is in a second valve position such that the process heat exchanger 302 is arranged to provide heating. The refrigerant receives heat in the rejection heat exchanger 304, e.g. by scavenging it from another environment. This refrigerant is routed to the compressor 306 via one of the non-restrictive flow paths 204a, 204b. The compressed refrigerant, which is hotter, is then routed from the compressor 306 output to the input of the process heat exchanger 302 via the other one of the non-restrictive flow paths 204a, 204b. The process heat exchanger causes heat from the refrigerant to be supplied to the surrounding environment, thereby cooling the refrigerant. The refrigerant at the output of the process heat exchanger 302 is then routed to the input of the rejection heat exchanger via the restrictive flow path 206. This causes a pressure drop and expansion of the refrigerant, lowering its temperature and pressure, enabling it to scavenge heat from the environment of the rejection heat exchanger 304. The cycle then repeats for as long as heating is required. In embodiments, the pressure drop caused by the refrigerant at the output of the process heat exchanger 302 being routed to the input of the rejection heat exchanger via the restrictive flow path 206 causes a substantial pressure drop. The substantial pressure drop can be considered any change in pressure of the refrigerant that significantly alters its saturation temperature, for example by greater than 10° C. It should be noted that the direction of flow of the refrigerant through each of the process heat exchanger 302, the rejection heat exchanger 304 and the compressor 306 is the same in both the first and second valve 200 positions. In other words, the refrigerant flow direction is the same regardless of whether the system 300 is providing heating or cooling. This avoids any abrupt changes in the refrigerant flow which could lead to component damage or unstable thermodynamic effects. In embodiments, a controller (not illustrated) is configured to control the valve 200 between the first and second valve positions. The controller may receive a user input temperature and/or a measured temperature corresponding to a room comprising the process heat exchanger 302 and control the valve 200 between the first and second valve positions and/or the amount of expansion of the refrigerant caused by the restrictive flow path 206 in dependence on the user input temperature and/or the measured temperature.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

The invention claimed is:

1. A valve for a reversible heat pump system, the valve comprising:
    six ports; and
    three flow paths for a refrigerant, the three flow paths being selectable between different pairs of the six ports, wherein:
    two of the three flow paths are non-restrictive flow paths; and
    one of the three flow paths is a restrictive flow path,
        wherein the restrictive flow path is arranged to cause expansion of the refrigerant,
        wherein the amount of expansion of refrigerant caused by the restrictive flow path is variable as a function of the valve position, and
        wherein the restrictive flow path is arranged to cause a linear change in the expansion of the refrigerant as a function of the valve position.

2. The valve of claim 1, wherein the restrictive flow path comprises a tapering slot.

3. The valve of claim 1, wherein the non-restrictive flow paths are arranged to cause substantially no expansion of the refrigerant.

4. The valve of claim 1, wherein the thermal conductivity of the valve between the non-restrictive flow paths is greater than the thermal conductivity of the valve between each of the non-restrictive flow paths and the restrictive flow path.

5. The valve of claim 1, further comprising a thermally insulating barrier between each of the non-restrictive flow paths and the restrictive flow path.

6. The valve of claim 1, further comprising a thermally conductive material between the non-restrictive flow paths.

7. The valve of claim 1, further comprising a motor which is operable to reselect the flow paths between the six ports.

8. The valve of claim 1, wherein the valve comprises a ball valve.

9. A reversible heat pump system, comprising:
    the valve according to claim 1;
    a compressor;
    a process heat exchanger having input and output sides through which refrigerant is supplied and discharged respectively; and a rejection heat exchanger having input and output sides through which the refrigerant is supplied and discharged respectively,
wherein the valve interconnects the compressor, the process heat exchanger and the rejection heat exchanger such that a refrigeration cycle can be established.

10. The reversible heat pump system of claim 9, wherein:
in a first valve position, the process heat exchanger is arranged to provide cooling; and
in a second valve position, the process heat exchanger is arranged to provide heating.

11. The reversible heat pump system of claim 10, wherein the direction of flow of the refrigerant through each of the process heat exchanger, the rejection heat exchanger and the compressor is the same in both the first and second valve positions.

12. The reversible heat pump system of claim 10, wherein in the first valve position, the restrictive flow path is coupled to the output side of the rejection heat exchanger and the input side of the process heat exchanger.

13. The reversible heat pump system of claim 10, wherein in the second valve position, the restrictive flow path is coupled to the output side of the process heat exchanger and the input side of the rejection heat exchanger.

14. The reversible heat pump system of claim 10, wherein in the first valve position:
a first one of the non-restrictive flow paths is coupled to the output side of the process heat exchanger and the compressor input; and
a second one of the non-restrictive flow paths is coupled to the compressor output and the input side of the rejection heat exchanger.

15. The reversible heat pump system of claim 10, wherein in the second valve position:
the first non-restrictive flow path is coupled to the compressor output and the input side of the process heat exchanger; and
the second non-restrictive flow path is coupled to the output side of the rejection heat exchanger and the compressor input.

16. The reversible heat pump system of claim 10, further comprising a controller configured to control the valve between the first and second valve positions.

17. The reversible heat pump system of claim 16, wherein the controller is further configured to:
receive a user input temperature and/or a measured temperature corresponding to a room comprising the process heat exchanger; and
control the valve between the first and second valve positions and/or the amount of expansion of the refrigerant caused by the restrictive flow path in dependence on the user input temperature and/or the measured temperature.

18. A valve for a reversible heat pump system, the valve comprising:
six ports; and
three flow paths for a refrigerant, the three flow paths being selectable between different pairs of the six ports, wherein:
two of the three flow paths are non-restrictive flow paths; and
one of the three flow paths is a restrictive flow path,
wherein the thermal conductivity of the valve between the non-restrictive flow paths is greater than the thermal conductivity of the valve between each of the non-restrictive flow paths and the restrictive flow path.

19. The valve of claim 18, further comprising a thermally insulating barrier between each of the non-restrictive flow paths and the restrictive flow path.

20. The valve of claim 18, further comprising a thermally conductive material between the non-restrictive flow paths.

* * * * *